United States Patent [19]
Ashenfelter et al.

[11] Patent Number: 4,864,561
[45] Date of Patent: Sep. 5, 1989

[54] TECHNIQUE FOR IMPROVED SUBJECTIVE PERFORMANCE IN A COMMUNICATION SYSTEM USING ATTENUATED NOISE-FILL

[75] Inventors: Robert C. Ashenfelter, Highlands; Marco J. Bonomi, Fair Haven; Duane O. Bowker, Neptune City, all of N.J.

[73] Assignees: American Telephone and Telegraph Company, New York, N.Y.; AT & T Bell Laboratories, Murray Hill, N.J.

[21] Appl. No.: 209,458

[22] Filed: Jun. 20, 1988

[51] Int. Cl.4 .............................................. H04J 3/17
[52] U.S. Cl. ..................................................... 370/81
[58] Field of Search ........................ 370/79, 80, 81, 17

[56] References Cited
U.S. PATENT DOCUMENTS 4,059,730 11/1977 Messerschmitt et al. ............. 179/15
4,408,324 10/1983 Black et al. ............................ 370/81
4,482,998 11/1984 Marouf et al. ........................ 370/82
4,630,304 12/1986 Borth et al. ........................... 381/94

OTHER PUBLICATIONS

Reuther et al., ICC'81, Denver, Colo., June 14–18, 1981, vol. 3, pp. 49.6.1–5.

Easton et al., IEEE Trans. On Comm., vol. COM-30, No. 4, Apr. 1982, pp. 803–807.

Primary Examiner—Robert L. Griffin
Assistant Examiner—Wellington Chin
Attorney, Agent, or Firm—Erwin W. Pfeifle

[57] ABSTRACT

The present invention relates to a method for providing noise fill in a communication system. The method comprises the detecting (16) of active and inactive information signal transmission periods to a destined end user, and the measuring (17) of background noise normally found in the transmission of the information signals to the destined end user. A noise fill signal is generated (21,22) and transmitted to the destined end user during information signal transmission gaps to that end user, which noise fill signal is at level below that of the measured background noise. Such attenuated noise fill level was found to provide improved subjective performance in, for example, speech transmissions when the noise fill is between −dB and −6 dB of the measured background noise level, with best subjective performance noted between the −3 and −6dB noise match levels. During inactive information signal transmission periods to the end user, the transmission channel can be used to transmit second signal transmissions to a second end user using a speech interpolation technique.

7 Claims, 3 Drawing Sheets

TECHNIQUE FOR IMPROVED SUBJECTIVE PERFORMANCE IN A COMMUNICATION SYSTEM USING ATTENUATED NOISE-FILL

TECHNICAL FIELD

The present invention relates to a technique for providing improved subjective performance in a communication system or network. More particularly, during moments when no speech or other information signal is being transmitted to an end user during a call, a noise-fill level is provided to a connected end user which is at a predetermined level below that normally found on a channel when there is both an information signal and a noise signal being received.

DESCRIPTION OF THE PRIOR ART

In certain communication systems it has been found advantageous to insert noise when a speech or data signal is not present. More particularly, in, for example, a packet communication system, an access interface (AI) generates voice packets only when its speech detector determines that there is activity present on a trunk. When gaps are encountered in the packet stream, the receiving AI inserts noise at a level corresponding to the continuous real-time estimates of the background noise present in the incoming trunk. These estimates can, for example, be made at the transmitting AI and sent to the receiving AI in the packet headers or preambles. Noise insertion is performed to prevent degradations in voice quality that could result from obvious discontinuities in the background noise level as the speech transmission is switched on and off. The term "noise pumping" is frequently used to describe the sudden changes in noise associated with inadequate background noise matching.

An exemplary communication system that uses a noise-matching technique is described, for example, in (1) the article "TASI-E Communication System" by R. L. Easton et al. in IEEE Transactions On Communications, Vol. COM-30, No. 4, April 1982, at pages 803–807, and in particular at pages 804 and 805, and (2) in U.S. Pat. No. 4,408,324 issued to D. H. A. Black et al. on Oct. 4, 1983. In such communication system, a channel-checking arrangement is used to periodically measure, inter alia, the noise on the channels of the system, the measured channel noise then being used along with the measured background noise on the incoming trunk in a noise-matching operation during silent periods on the channel. In other words, when a trunk is not connected to a channel, such communication system inserts noise at the transmitting or receiving end of that channel to make the total noise at the channel output equal to the same value as when the trunk is connected to the channel and a signal is being transmitted over the channel, thereby avoiding various effects such as noise-pumping.

Similar techniques are also used in digital conferencing arrangements as described, for example, in U.S. Pat. No. 4,482,998 issued to M. A. Marouf et al. on Nov. 13, 1984. There, when no one is momentarily speaking during a conference connection, which is formed from a plurality of ports on a bridge connection, a minimum number of selected ports are maintained in a holdover state to provide background noise on the bridge. This ensures that each conferee receives some minimum background noise to eliminate the feeling that the conferee is cut off from the conference.

The problem remaining in the prior art is to provide a technique which can further improve, if possible, the subjective performance of a communication system, which includes speech interpolation and may or may not include noise-matching.

SUMMARY OF THE INVENTION

The foregoing problem in the prior art has been solved in accordance with the present invention which relates to a technique in a communication system such as, for example, a Wideband Packet Technology (WPT) Access Interface (AI) with speech interpolation, wherein a noise measurement at the transmitter end, or the reproduced noise-fill at the receiver end, is attenuated or reduced by a predetermined amount from the average monitored level of noise normally received over a channel when communication is taking place before being provided to an end user during non-information transmission periods.

Other and further aspects of the present invention will become apparent during the course of the following description and by reference to the accompanying drawings.

DETAILED DESCRIPTION

Figure 1:
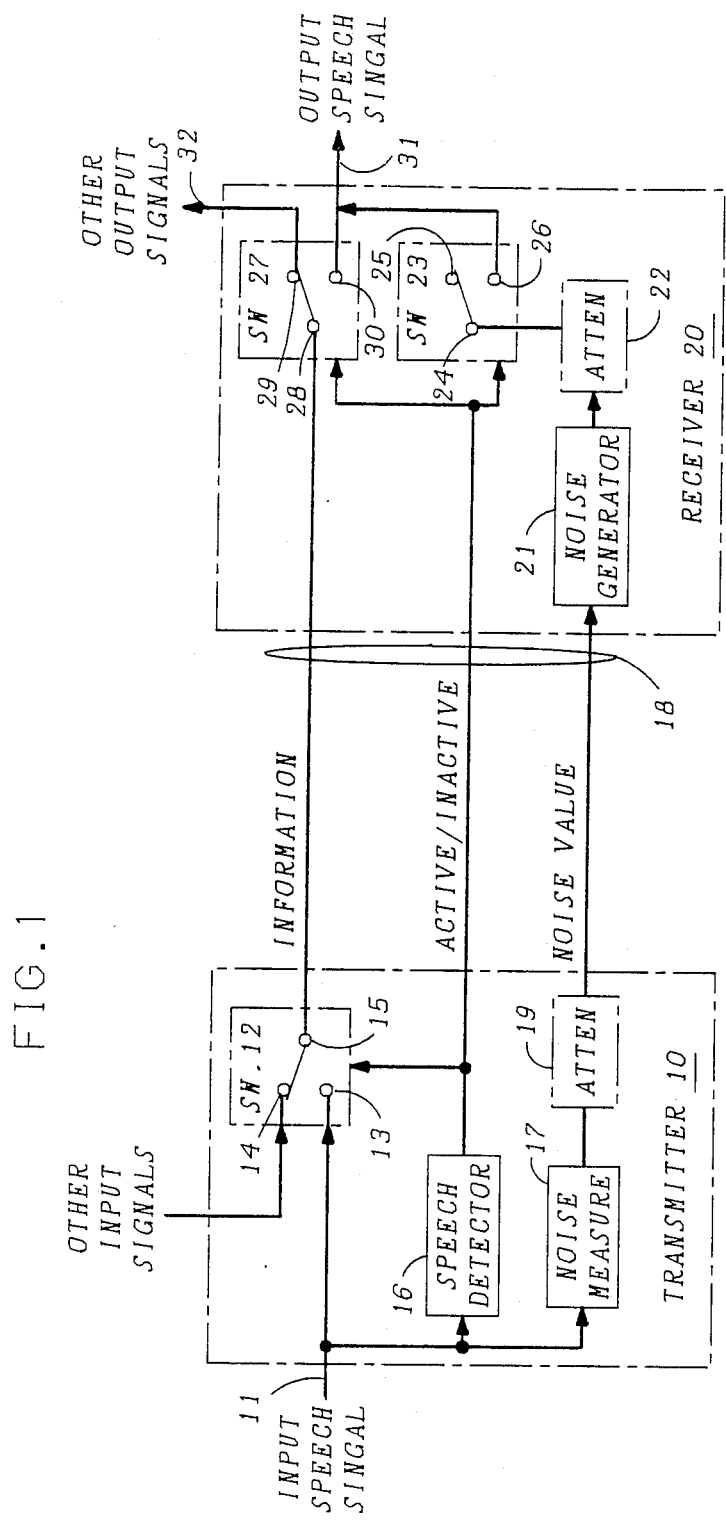
FIG. 1 is a block diagram of pertinent parts of an exemplary communication system employing the reduced noise-fill technique of the present invention.

FIG. 1 shows only pertinent parts of a transmitter 10 and a receiver 20 within a communication system for practicing the present noisematching technique, where information signal detection and noise measurements are performed at transmitter 10 and used at both the transmitter 10 and the associated receiver 20. For purposes of explanation hereinafter, it will be assumed that the information signal used as an input to transmitter 10 is a speech signal, but it should be understood that the information signal could comprise any other information signal, such as a music signal, that a person associated with a remote receiver might be listening to. Additionally, it should be understood that any form of information signal transmission can be used for practicing the present invention of noise matching, as, for example, analog, digital or packet transmission with a wideband or narrow band spectrum, since the form of transmission is arbitrary.

More particularly, during a connection between two end users in voice communication, the input speech signal from a first end user at input 11 is directed to each of (a) a first input terminal 13 of a switching means 12, (b) a speech detector 16, and (c) a noise measuring arrangement 17. Another input signal, such as data signals, that might be sent over the same communication channel 18 between transmitter 10 and receiver 20 is provided as an input to a second input terminal 14 of switching means 12. Speech detector 16 monitors input 11 to determine whether a speech signal is active (present) or inactive (not present) and provides an output control signal which is representative of the speech activity and is received by both switching means 12 in transmitter 10 and remote receiver 20 via communication channel 18. The control signal from speech detector 16 causes switching means 12 in transmitter 10 to (a) connect input terminal 13 to output terminal 15 when a speech signal is being detected at input 11 in order to transmit the detected speech signal to receiver 20 over communication channel 18, and (b) to connect input terminal 14 to output terminal 15 when a speech signal at input 11 is not detected in order to transmit the other input signal, when present, arriving at second input terminal 14 of switching means 12 to receiver 20 over communication channel 18. The other input signal on input 14 of switching means 12 can be, for example, a packet signal which has its packets stored in a memory (not shown) for transmission by a gating means (not shown) which is responsive to the same speech detector output control signal that causes switching means 12 to connect its input 14 with its output 15. In this manner other signals can be transmitted on communication channel 18 when it is not being used for the speech signal transmission and thereby provide a Speech Interpolation technique.

Noise measuring arrangement 17 is used to determine the level of the background noise in the speech signal at input 11 and to generate a background noise level control signal for transmission either directly to receiver 20 over communication channel 18 or indirectly to receiver 20 via optional attenuator arrangement 19. In accordance with the present invention, when attenuator arrangement 19 is present in transmitter 10, it functions to reduce the value of the determined background noise level by a predetermined amount before being transmitted to receiver 20 over channel 18. It is to be understood that attenuator arrangement 19 is an optional element and (a) is, therefore, shown by dashed lines, and (b) when present in transmitter 10 can form a part of noise measuring arrangement 17. Alternatively, attenuator arrangement 19 can be disposed in receiver 20 as an optional attenuator arrangement 22 as will be described hereinafter. It is to be understood that the concurrent information, active/inactive, and noise value signals transmitted on communication channel 18 are transmitted as separate portions of an overall communication signal and, therefore, can be concurrently transmitted in any suitable manner such as, for example, on separate leads or in a composite signal in, for example, the header and information portions of a packet or in different frequency subbands of the composite signal. It is to be understood that speech detector 16 and noise measuring arrangement 17 may actually be formed as part of one circuit as will be shown hereinafter in FIG. 2, but is described here as separate elements for ease of description.

At receiver 20, (a) the active/inactive control signal portion is received by each of a first and a second switching means 23 and 27 in order to control the path through these switching means; (b) the information signal portion is received at an input terminal 28 of second switching means 27; and (c) the noise value control signal portion is received by a noise generator 21. Noise generator 21 is responsive to the background noise level control signal transmitted by noise measuring arrangement 17 in transmitter 10 for generating a level of noise which corresponds to the level of background noise indicated by the received background noise level control signal. In accordance with the present invention, the background noise signal produced by noise generator 21 is provided to the input terminal 24 of first switching means 23 either (a) directly when the noise value signal from noise measuring arrangement 17 has been previously attenuated by the predetermined amount in attenuator 19, or (b) indirectly via attenuator 22 when the noise value signal from noise measuring arrangement 17 has not been previously attenuated before being transmitted. It is to be understood that optional attenuator 22 can be a separate circuit, disposed before or after noise generator 21, or form a part of noise generator 21. Regardless of which attenuator 19 or 22 is used, the resultant noise signal provided to input terminal 24 of first switching means 24 is a signal which has been attenuated or reduced in level by a predetermined amount from the background noise level which was determined for the signal at input 11 of transmitter 10.

In operation, when speech detector 16 at transmitter 10 detects the presence of a speech signal, including background noise, at input 11, it generates a control signal having first value which is transmitted to receiver 20 while simultaneously causing switching means 12 to connect input terminal 13 to output terminal 15 and thereby transmit the speech signal, and included background noise, to receiver 20. Noise measuring arrangement 17, which has been continuously determining the background noise level received at input 11, transmits a noise value, which either has been attenuated (when attenuator 19 is present) or has not been attenuated (when attenuator 19 is not present) to receiver 20. At receiver 20, the received first value control signal from speech detector 16 causes first switching means 23 to close the path between input terminal 24 and output terminal 26 to divert any noise signal from noise generator 21 away from a first output path 31 of receiver 20, while simultaneously causing second switching means 27 to close the path between input terminal 28 and output terminal 30 to direct the received speech signal, and included background noise, to first output path 31.

When speech detector 16 does not detect a speech signal at input 11 of transmitter 10, it generates a control signal having a second value which is transmitted to receiver 20 over communication channel 18 while simultaneously causing switching means 12 to connect input terminal 14 to output terminal 15 and thereby transmit other input signals to receiver 20. At receiver 20, Noise Generator 21 generates a noise signal at a level specified by the current measured background noise level of the signal at input 11, or by a prior measured background noise level value measured during a last period when speech signal was not detected, this noise level being determined in transmitter 10 by noise measuring arrangement 17 with or without optional attenuator 19. The received second value control signal from speech detector 16 causes first switching means 23 to close the path between input terminal 24 and output terminal 25 to direct the attenuated noise fill signal obtained from noise generator 21 and optional attenuator 22 (when present) onto first output path 31 from receiver 20, while simultaneously causing second switching means 27 to close the path between input terminal 28 and output terminal 29 to direct the received other information signals onto a second output path 32 from receiver 20.

By the above technique, when a speech signal, including background noise, is detected at input 11 of transmitter 10, the speech plus background noise signal is transmitted to receiver 20 via switching means 12 and communication channel 18, and directed onto first output path 31 from receiver 20 by second switching means 28. No additional attenuated noise fill signal is provided to first output path 31 from first switching means 23 because the path between input terminal 24 and output terminal 25 is not closed. When no speech signal is detected at input 11 of transmitter 10, then another input signal is transmitted via switching means 12 and communication channel 18 to receiver 20 in place of the normally transmitted speech signal, where this other information signal is directed by second switching means 27 onto second output path 32 while only an attenuated noise fill signal is transmitted over first output path 31 to the listening, or possibly speaking, end user. It is to be understood that first and second switching means 23 and 27 at receiver 20 can have any suitable arrangement to realize comparable interconnections.

Figure 2:
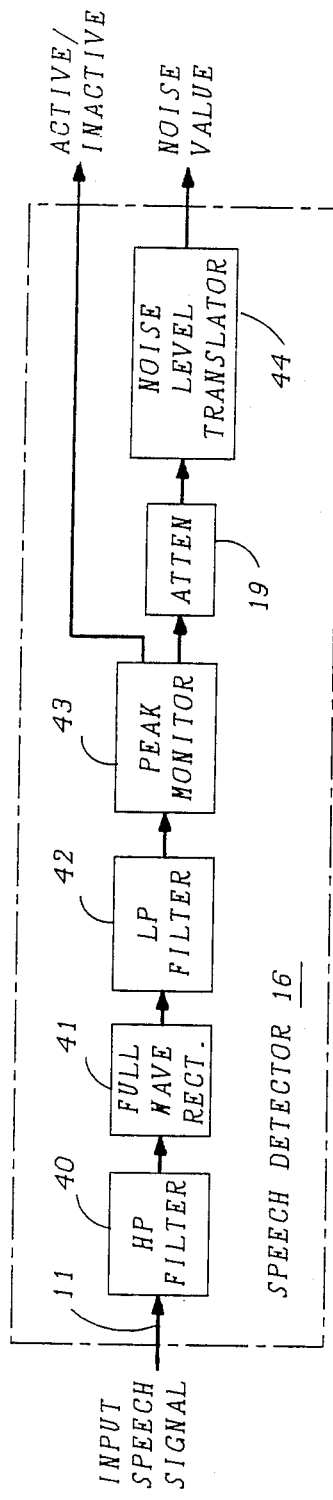
FIG. 2 depicts an exemplary arrangement for a combination of a speech detector, noise measuring means and attenuator in the transmitter of FIG. 1.

In an exemplary wideband packet technology transmitter 10, which is also known as an access interface (AI), with digital speech interpolation, an exemplary arrangement for providing noise matching in transmitter 10 according to the present invention is shown in FIG. 2. In the arrangement of FIG. 2, it will be seen that speech detector 16, noise measuring arrangement 17 and optional attenuator 19 of FIG. 1 can all be formed as part of speech detector 16. Noise matching involves two functions, noise level estimation and noise generation. Noise level estimation is performed as part of the speech detection function in speech detector 16 by the following exemplary digital circuits. The speech signal at input 11 is high-pass filtered in HP filter 40 to reduce hum and remove any DC component. The resultant signal is full-wave rectified in rectifier 41 and then low-pass filtered in LP filter 42. The resulting envelope signal is monitored in peak monitor circuit 43 for the peaks and minima levels. These peak and minima levels are taken to be measures of the speech level and the background noise level, respectively, and are used by speech detector 16 in setting its speech threshold. In accordance with the present invention, when the noise value to be transmitted to receiver 20 is to be attenuated before transmission to receiver 20, optional attenuator 19 would be used with a noise level translator 44 to provide a digital noise value which is at the predetermined reduced or attenuated value. It is to be understood that attenuator 19 can be either before or after or a part of noise level translator 44.

In operation, the noise level measure from speech detector 16 can be made available as, for example, an 8-bit quantity for transmission to noise level translator 44 and/or attenuator 19. The range of noise levels this represents could be divided into 16 exemplary parts and translated to a 4-bit noise level value by noise level translator 44. This 4-bit noise level value would be transmitted in, for example, the header of each speech packet during the period when the end user associated with input 11 is active and providing a speech signal. When the end user associated with input 11 becomes inactive and, therefore, packets are no longer sent, the noise level value transmitted in the last packet, and received at receiver 20, is used to generate an appropriate random noise signal by noise generator 21, which noise signal is inserted in the speech gap at output 31 by switching means 23. In an exemplary arrangement of noise generator 21, for each of the 16 noise levels, noise generator 21 can produce a random or pseudorandom sequence of Pulse Code Multiplex (PCM) samples with the desired noise powers.

Figure 3:
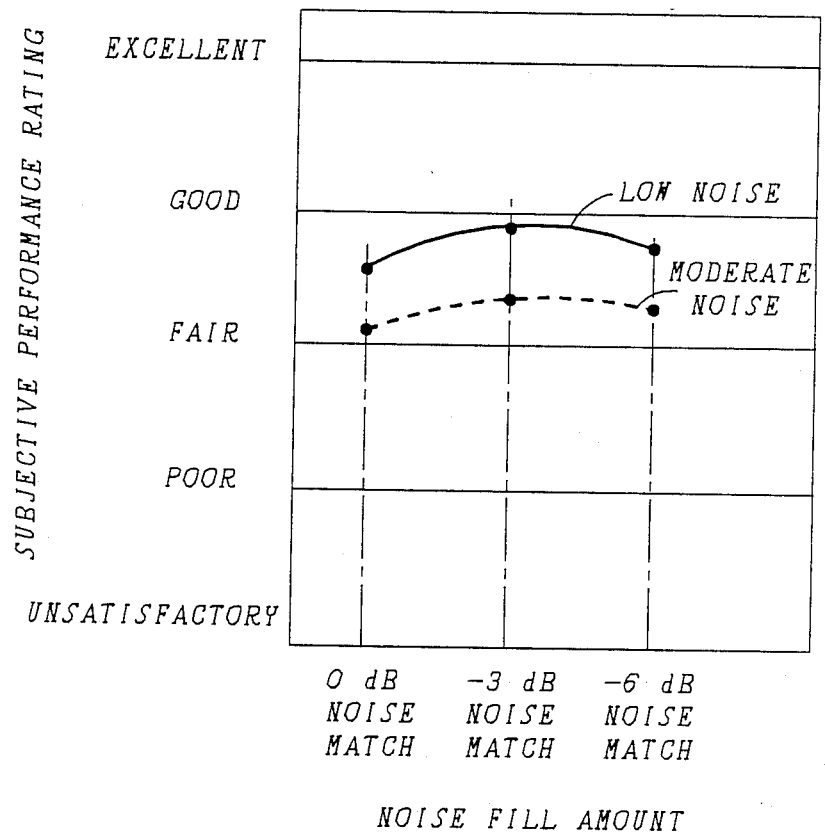
FIG. 3 is a graph representing exemplary result of providing improved subjective performance of speech transmission by reducing the amount of noise fill provided during gaps in the speech transmission below the point (0 dB) where the matched noise level is exactly equal to the input noise level.

In accordance with the present invention, the noise fill signal to be provided during gaps in the output speech signal at output 31 of receiver 20 to provide improved subjective performance of speech signals was found to occur when the noise signal reduced below the 0 dB noise match value. More particularly, in an illustrative example shown in FIG. 3, the subjective performance of speech transmission is found to be improved, in accordance with the concept of the present invention, as the noise fill signal is reduced below the 0 dB noise match value. From the graph of FIG. 3, it can be seen that the subjective performance was found to increasingly improve as the background noise fill is decreased from the 0 dB noise match value until it reaches a maximum between the −3 and −6 dB noise match value depending on the actual noise level at input 11. The subjective performance was found to decrease at noise match values below −3 dB. Therefore, it is shown that the end users find the subjective performance of speech transmission better when the noise match level is reduced below the 0 dB, level with the best subjective performance occurring between the −3 and −6 dB noise match levels.

We claim:

1. A method of providing noise matching to a destined end user in a communication system during each gap of inactive signal transmission between each active signal transmission to the destined end user, the method comprising the steps of:
 (a) detecting periods of each active signal transmission and each inactive signal transmission destined for the end user;
 (b) concurrent with step (a), measuring the background noise level at the input of a transmitter providing the signal transmission destined for the end user during either one or both of the active signal transmission and the inactive signal transmission periods;
 (c) during the detected period of each active signal transmission in step (a), directing the active signal transmission to the destined end user, and
 (d) during the detected period of each inactive signal transmission in step (a), generating a noise fill signal for transmission to the destined end user, the noise fill signal provided to the destined end user comprising a level that is attenuated by a predetermined amount from the background noise level measured at the input of the transmitter in step (b) for providing improved subjective performance.

2. A method of providing noise matching according to claim 1 wherein in performing step (d) providing an attenuated noise fill signal which is at a level between −1 dB and −6 dB of the background noise level measured in step (b).

3. A method of providing noise matching according to claim 1 wherein the detected active signal transmission and inactive signal transmission periods in step (a) are used for generating a first and a second control signal, respectively, for causing the implementing of respective steps (c) and (d).

4. A method of providing noise matching according to claim 3 wherein the method comprises the further step of:

(e) causing a second different first active signal transmission to be transmitted to a second destined end user over a channel normally used for the active signal transmissions to the first end user when the second control signal is generated during the performing of step (a) during the period when signal transmission to the first end user is inactive.

5. A receiver for use in a communication system, the receiver comprising:

means for receiving from a remote transmitter active signal transmissions interspersed with inactive signal transmissions which are destined for a predetermined end user of the receiver; and generating and directing means responsive to (a) a first control signal indicating each period of active signal transmission for directing the received active signal transmission to the predetermined end user, and (2) both a second control signal indicating each period of inactive signal transmission, and a third control signal indicating a background noise level measured at the input of the remote transmitter for generating a noise fill signal comprising a level that is attenuated by a predetermined amount from the background noise level measured at the input of the remote transmitter and directing the attenuated noise fill signal to the predetermined end user during each inactive signal transmission period for providing improved subjective performance.

6. A receiver according to claim 5 wherein the generating and directing means generates and directs a noise fill signal to the predetermined end user which is at a level between $-1$ dB and $-6$ dB of the background noise level measured at the input of the remote transmitter.

7. A receiver according to claim 5 wherein the generating and directing means comprises:

switching means responsive to the second control signal for (1) directing a second different active signal transmission destined for a predetermined second end user of the receiver which is received from the remote transmitter over a same channel to the predetermined second end user, while concurrently (2) directing the attenuated noise fill signal to the predetermined first end user.

* * * * *